Nov. 6, 1956    W. F. DIETRICHSON    2,769,404
ANCHORING MEANS FOR VEHICLE CARGO
Filed March 6, 1952    3 Sheets-Sheet 1

INVENTOR
WILLIAM F. DIETRICHSON
BY
George R. Ericson
ATTORNEY

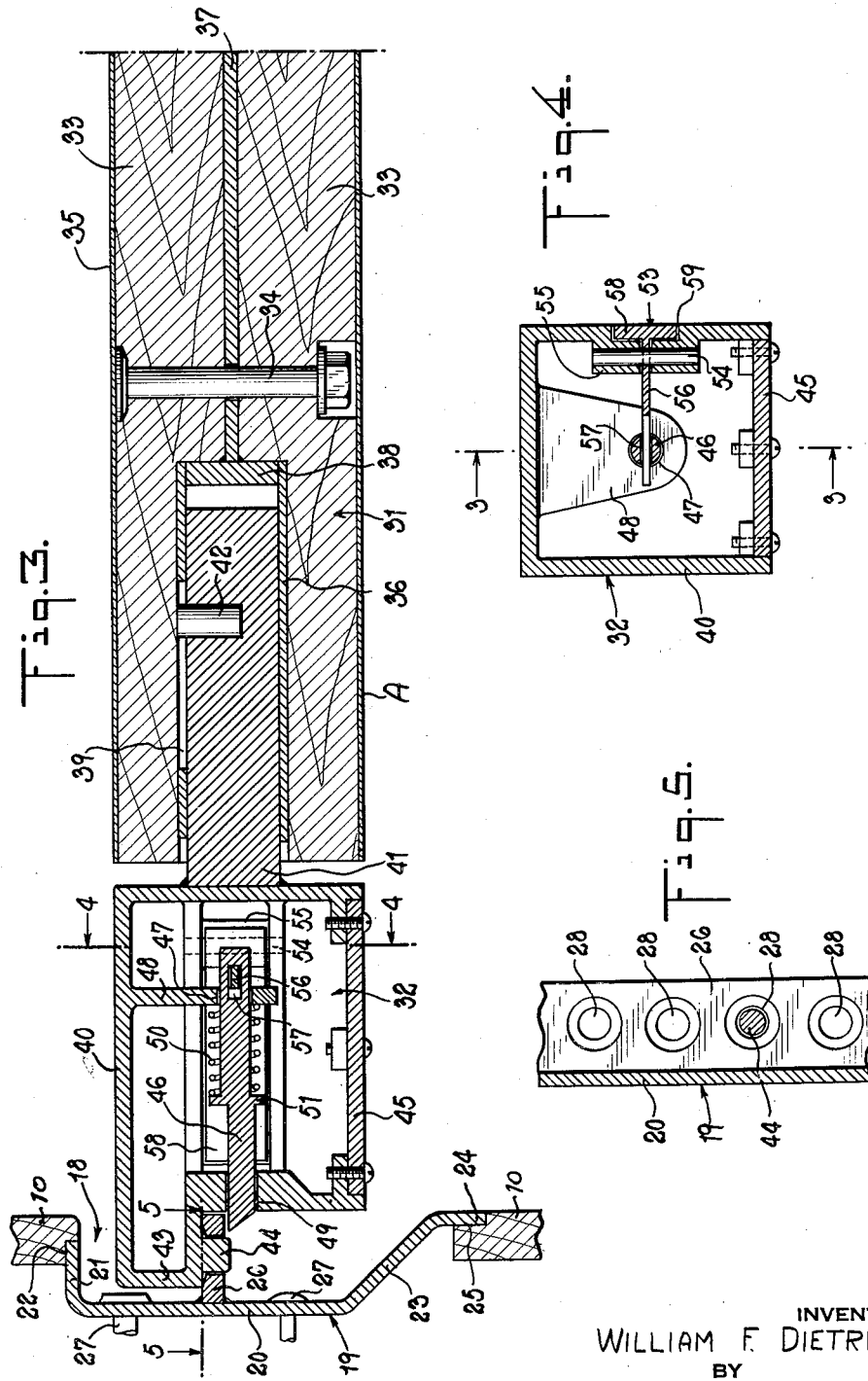

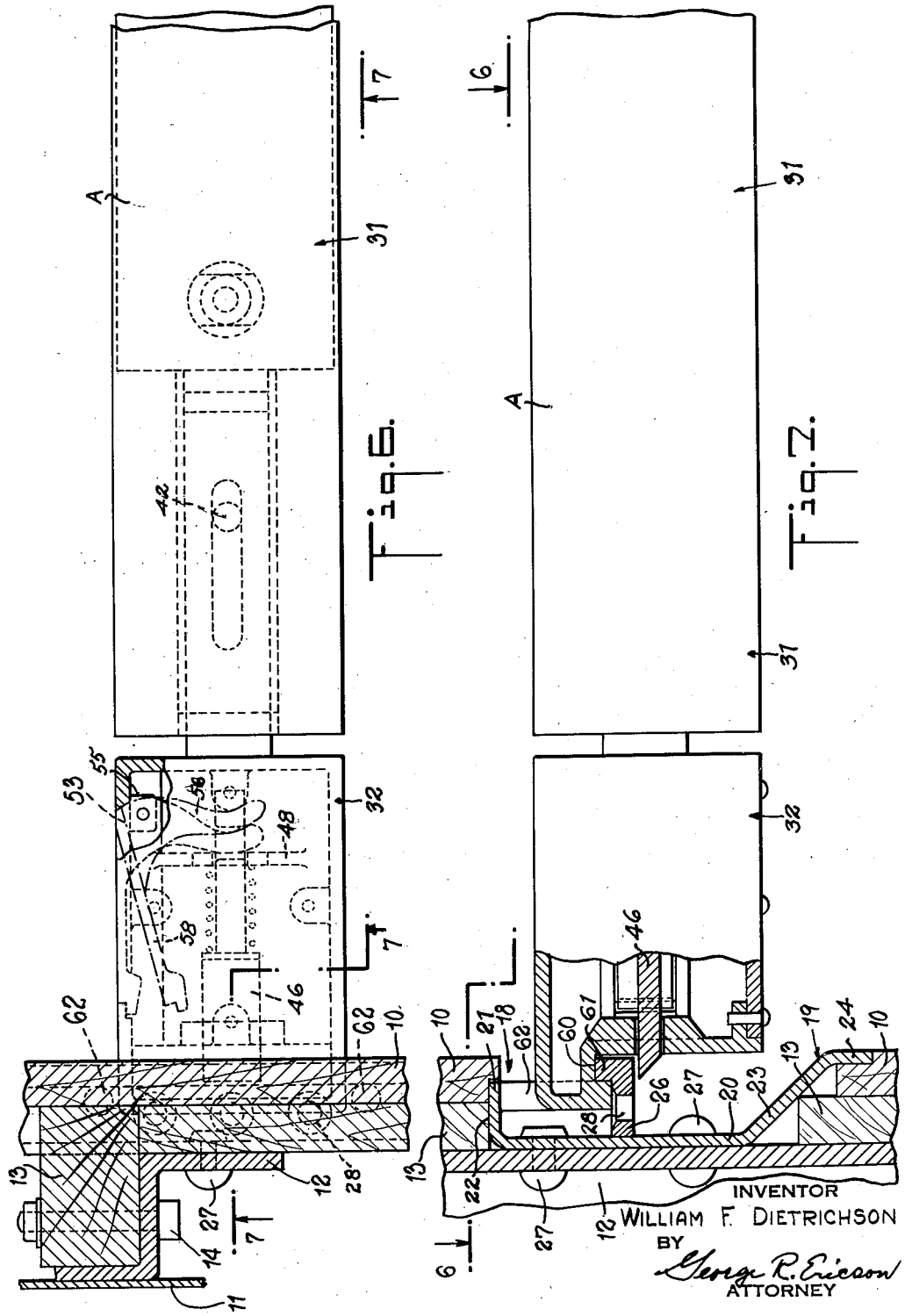

United States Patent Office 2,769,404
Patented Nov. 6, 1956

2,769,404

ANCHORING MEANS FOR VEHICLE CARGO

William F. Dietrichson, Garden City, N. Y., assignor to ACF Industries, Incorporated, a corporation of New Jersey Application March 6, 1952, Serial No. 275,161

1 Claim. (Cl. 105—369)

This invention relates to freight carrying containers, and more particularly to equipment for retaining cargo in desired position within vehicles.

One of the objects of this invention is to provide anchor means for devices utilized for securing cargo or dunnage in a vehicle to prevent damage to the same that would otherwise result from shifting during transportation.

Another object of the invention is to provide a vehicle for transporting miscellaneous lading with anchor devices for load securing means that do not project into the storage space or leave any opening in the car lining through which granular and similar bulk lading can pass when the vehicle is used for such purpose.

A further object of the invention is to provide interior fittings for lading carrying vehicles formed to serve as anchors for either tie straps or cross-bar cargo securements.

Another object of the invention is to provide interior fittings, for lading carrying vehicles, and cross-bar cargo securements that can be readily applied and secured to the fittings in desired load securing position.

These and other objects of the invention will be apparent to those skilled in the art from a study of the following description and accompanying drawings, in which:

Fig. 3 is a fragmentary vertical sectional view of the vehicle and cross-bar taken on line 3—3 of Fig. 4 showing details of the cross-bar and its anchorage with a vehicle fitting.

Fig. 4 is a sectional view of the cross-bar taken on line 4—4 of Fig. 3.

Fig. 5 is a sectional view through one of the anchor structures taken on line 5—5 of Fig. 3.

Fig. 6 is a sectional view through a portion of the vehicle taken on line 6—6 of Fig. 7 showing a modified form of anchor structure for receiving either a cross-bar or tie strap.

Fig. 7 is a sectional view, similar to Fig. 3, and taken on line 7—7 of Fig. 6 showing the modified form of anchor structure.

Figure 1:
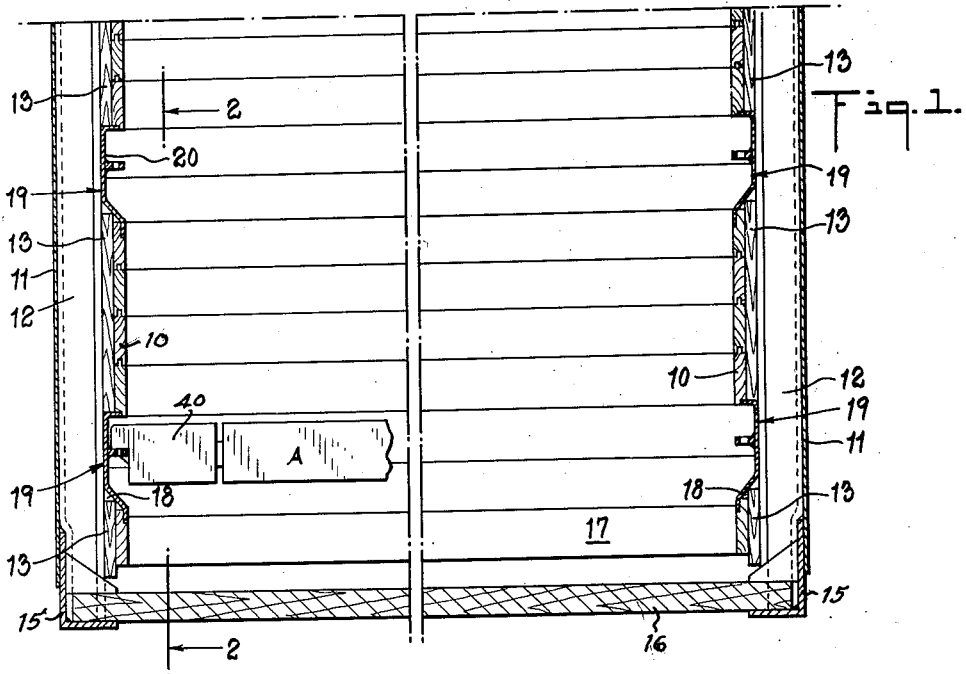
Fig. 1 is a transverse sectional view of a lading carrying vehicle equipped with anchor means or fittings for cross-bar load securements.

While the invention is illustrated as applied to a railroad box car, it can be applied to various other vehicles or containers for transporting various kinds of dunnage.

In the drawings, the house or box car illustrated is of conventional construction. The opposite side walls of the car are similar and comprise an inner lining 10, outer sheathing 11 and Z-posts 12 intermediate the lining and sheathing. Posts 12 are preferably formed of metal and the sheathing is welded or otherwise secured to the outer flanges of the posts. Wooden furring members 13 are secured by bolts 14 to the posts and extend inwardly of the car beyond the posts to serve as abutments and anchors for the wooden lining 10. Bottom sill angle members 15 are welded to the posts and support the flooring 16. One of the end walls is indicated by numeral 17.

The linings of the side walls of the car are made up of wooden sections having longitudinally extending spaces 18 therebetween and portions of the furring posts extending interior of the posts are notched out adjacent spaces 18 for the reception of fittings or anchor means for cargo securing devices. The anchor means consist of a plurality of modified E-shaped members 19 preferably formed of metal channels and having their back portions 20 suitably fixed, as by rivets 27, to the inner flanges of the posts 12. The upper flanges 21 of the anchor structures extend into recesses 22 formed in the outer bottom portion of the side wall lining sections while the lower flanges 23 of the anchor structures slope downwardly over the upper portions of the side wall lining sections to provide integral bulk lading shed plate portions. These shed plate portions 23 terminate in vertical end portions 24 that lie flush in recesses 25 in the upper inner portion of the side wall lining sections. The middle flanges 26 or supporting bracket of the anchor devices have a series of vertically extending openings 28 therethrough. These fitting or anchor devices are preferably formed as metal channels having the intermediate flanges 26 welded to the backs 20. It will be noted that the upper and lower flanges of the channels extend toward the interior of the car and lie snugly in recesses 22 and 25 in sealing engagement with the lining so that no bulk cargo can enter the spaces between the lining and the outer sheathing. Also, the downwardly sloping lower flanges or shed plates 23 will prevent accumulation of granular cargo in the lower portions of the channels. The upper surfaces of the flanges 26 around the openings are beveled to prevent accumulation of cargo on the tops of the flanges adjacent the openings.

Figure 2:
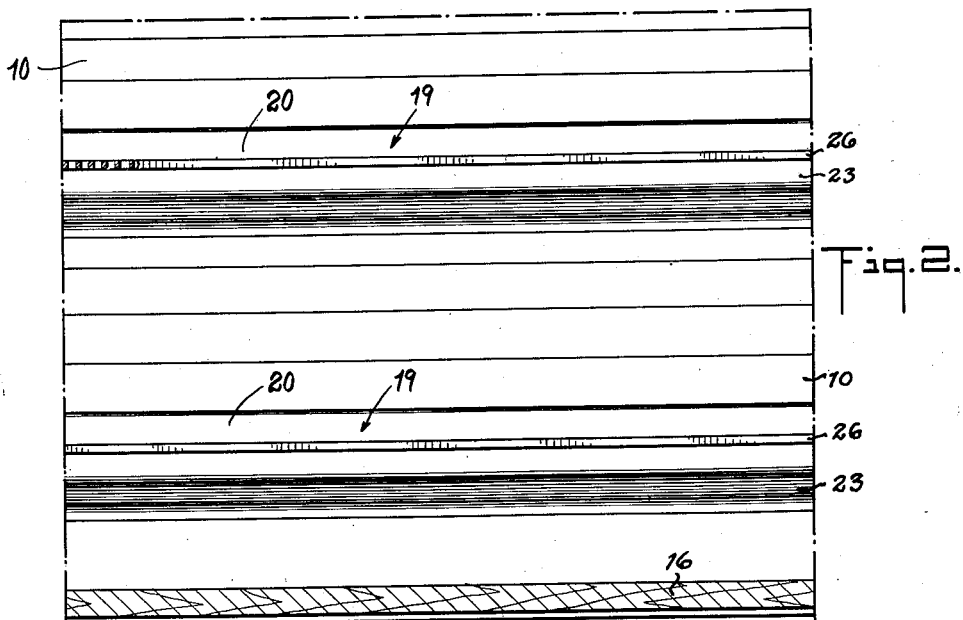
Fig. 2 is a sectional view of the vehicle taken on line 2—2 of Fig. 1 showing an interior vehicle side wall in elevation.

As shown in Figs. 1 to 4 inclusive, the middle flanges 26 of the fittings 19 are flat and serve as supports and anchors for similar cross-braces A each comprised of a body 31 and end sections 32. At least one of the end sections is adjustable lengthwise of the body. Body 31 is comprised of wooden beams 33 secured together by bolts 34 and encased by a metal cover 35. The beams are formed to receive cylindrical sleeves 36 in each end and a tie bar 37 extending between the adjacent ends of the sleeves. The tie bar is welded at each end to disks 38 secured within the adjacent ends of the sleeves. Bolts 34 pass through the tie bar and each sleeve is provided with a longitudinally extending slot 39.

The end sections of the cross-braces A are each comprised of a head 40 and a shank 41 that is slidably mounted in a sleeve 36, the shank carrying a pin 42 projecting into slot 39 to limit longitudinal movement of the end section 32 and to prevent rotational movement thereof relative to the body. The head 40 consists of a hollow casting having an overhanging outer end 43 from the underface of which securement member 44 projects. The underface of the overhanging end of the head is adapted to be supported on flange 26 of the anchor device when securement member 44 is anchored in a desired opening 28. This anchorage at each end of the cross-bar prevents its displacement in a direction longitudinally of the car.

The heads of the end sections of the cross-bar carry locking devices for preventing their vertical displacement while in anchored relation with the car fittings. A slidable locking member 46 extends through opening 47 in an interior flange 48, depending from the top wall of the head casing, and opening 49 in the end wall of the head casing. Coil spring 50 located between flange 48 and flange 51 on the locking member normally presses the latch outwardly of the head casting where it projects beneath the flange 26 of the car fitting to prevent vertical removal of the securement member 44 from the opening in which it is anchored. Access is had to the interior of the head casting through a bottom opening over which a cover 45 is detachably secured.

In order to shift the cross-bar from a secured position, the latch 46 can be manually shifted inwardly by mechanism mounted in the end head casting to clear the flange 26 when the cross-bar is moved upwardly. Locking member 46 is shifted to released position by bell-crank lever 53 pivotally mounted on pin 54 carried by boss 55 extending inwardly from a side wall of the head casting 40. Arm 56 of the bell-crank lever projects into slot 57 in the latch and arm 58 normally lies flush in opening 59 in the side wall of the head casting from which boss 55 projects. Arm 58 can be engaged by the fingers of the person adjusting the cross-bar and pressed inwardly of the head casting to rock the bell-crank counterclockwise and thereby withdraw the locking member from spring projected position.

In Figs. 6 and 7, the fitting and anchor end of the cross-bar end heads differ from those previously described. In this form of the invention, the anchor projection 44 is eliminated and the under portion of the overhanging end is formed with a recess 60 for the reception of an upstanding complementary lip 61 on the inner end of flange 26 of the car fittings. This interlocking of the cross-bar and fitting restricts any tendency of the cross-bar to turn in a horizontal plane. Shifting of the cross-bar in a direction longitudinally of the car is restricted by a series of spaced vertical pins or posts 62 separated a distance slightly greater than the width of the cross-bar head section. These pins extend between the upper flanges 21 and middle flanges 26 of the car fittings and are secured thereto at their ends, preferably by welding. Vertical displacement of this type of cross-bar is prevented by the locking members 46, previously described. Pins 62 also serve as anchorage for the ends of the tie straps such as shown in Patent 2,226,667 when used for holding cargo in place.

As at least one of the end sections of the cross-bar is adjustably mounted, it can be shifted to suit variances in the distance between the fittings at opposite sides of the car.

The invention may be modified in various respects as will occur to those skilled in the art and the exclusive use of all modifications as come within the scope of the appended claims is contemplated.

What is claimed is:

Cargo bracing means comprising a body, hollow heads carried by and projecting from the ends of the body, anchor means on the under face of said heads, slidable locking members carried by said heads below said anchor means, spring means in said heads normally urging said locking means in a direction away from the ends of the heads, and bell-cranks pivoted in said heads, said bell-cranks operatively engaging said locking members and being accessible from the exterior of the heads for operation to retract said locking members.

References Cited in the file of this patent

UNITED STATES PATENTS

| | | |
|---|---|---|
| 1,064,130 | Conlin | June 10, 1913 |
| 1,597,091 | McMahan | Aug. 24, 1926 |
| 2,056,704 | Anderson | Oct. 6, 1936 |
| 2,497,683 | Nampa et al. | Feb. 14, 1950 |
| 2,559,240 | Wiggin | July 3, 1951 |